Dec. 28, 1965 J. T. POTTER ETAL 3,226,685

DIGITAL RECORDING SYSTEMS UTILIZING TERNARY, N BIT BINARY AND OTHER SELF-CLOCKING FORMS

Filed June 2, 1961 7 Sheets-Sheet 1

| DECIMAL | 6 DIGIT BINARY | 4 DIGIT TERNARY | 4 DIGIT BINARY CODED TERNARY PLUS 1 |
|---|---|---|---|
| 0 | 000000 | 0000 | 01 01 01 01 |
| 1 | 000001 | 0001 | 01 01 01 10 |
| 2 | 000010 | 0002 | 01 01 01 11 |
| 3 | 000011 | 0010 | 01 01 10 01 |
| 4 | 000100 | 0011 | 01 01 10 10 |
| 5 | 000101 | 0012 | 01 01 10 11 |
| 6 | 000110 | 0020 | 01 01 11 01 |
| 7 | 000111 | 0021 | 01 01 11 10 |
| 8 | 001000 | 0022 | 01 01 11 11 |
| ⋮ | ⋮ | ⋮ | ⋮ |
| 60 | 111100 | 2020 | 11 01 11 01 |
| 61 | 111101 | 2021 | 11 01 11 10 |
| 62 | 111110 | 2022 | 11 01 11 11 |
| 63 | 111111 | 2100 | 11 10 01 01 |

INVENTORS
JOHN T. POTTER
GEORGE E. COMSTOCK 3D
BY ANDREW GABOR

Alfred W. Barber

ATTORNEY

| DECIMAL | 3 DIGIT QUATERNARY |
|---|---|
| 0 | 000 |
| 1 | 001 |
| 2 | 002 |
| 3 | 003 |
| 4 | 010 |
| -- | --- |
| 60 | 330 |
| 61 | 331 |
| 62 | 332 |
| 63 | 333 |

| BINARY CODED 3 DIGIT QUATERNARY | 3 DIGIT QUATERNARY BINARY CODED PLUS 1 |
|---|---|
| 00 00 00 | 01 01 01 |
| 00 00 01 | 01 01 10 |
| 00 00 10 | 01 01 11 |
| 00 00 11 | 01 01 00 |
| 00 01 00 | 01 10 01 |
| -- -- -- | -- -- -- |
| 11 11 00 | 00 00 01 |
| 11 11 01 | 00 00 10 |
| 11 11 10 | 00 00 11 |
| 11 11 11 | 00 00 00 |

INVENTORS
JOHN T. POTTER
GEORGE E. COMSTOCK 3D
BY ANDREW GABOR

Alfred W. Barber
ATTORNEY

MATRIX CONVERTS 6 BIT BINARY TO 64 LINE OUTPUT

64 IN LINE TO 4 DIGIT BINARY CODED TERNARY PLUS I MATRIX

INVENTORS
JOHN T. POTTER
GEORGE E. COMSTOCK 3D
BY ANDREW GABOR
Alfred W. Barber
ATTORNEY INVENTORS
JOHN T. POTTER
GEORGE E. COMSTOCK 3D
BY ANDREW GABOR
Alfred W. Barber
ATTORNEY INVENTORS
JOHN T. POTTER
GEORGE E. COMSTOCK 3D
BY ANDREW GABOR
Alfred W. Barber
ATTORNEY INVENTORS
JOHN T. POTTER
GEORGE E. COMSTOCK 3D
ANDREW GABOR
BY Alfred W. Barber
ATTORNEY INVENTORS
JOHN T. POTTER
GEORGE E. COMSTOCK 3D
BY ANDREW GABOR
Alfred W. Barber
ATTORNEY United States Patent Office 3,226,685
Patented Dec. 28, 1965

3,226,685

DIGITAL RECORDING SYSTEMS UTILIZING TERNARY, N BIT BINARY AND OTHER SELF-CLOCKING FORMS

John T. Potter, Locust Valley, George E. Comstock 3rd, Huntington, and Andrew Gabor, Port Washington, N.Y., assignors to Potter Instrument Company, Inc., Plainview, N.Y., a corporation of New York
Filed June 2, 1961, Ser. No. 114,431
6 Claims. (Cl. 340—172.5)

The present invention concerns digital recording systems and, in particular, methods of and means for recording and reproducing information in ternary, quaternary or higher order forms including *n* bit binary for providing high density, self-clocking recordings.

One of the characteristics of high density recording is that the individual information cells making up a character are contiguous. A binary cell is one which may have one of two possible characteristics to convey one of two possible meanings, for example, "zero" or "one." For the recording to have self-clocking characteristics, some distinguishing feature is preferably present in every information cell and at the same relative position within the cell although certain deviations are possible as set forth below. This feature generally will be a change of the state of the recording medium which, in the case of magnetic recording will be a reversal of the state of magnetization. The recording device to provide this change or reversal will exhibit a transition from no excitation to full excitation or a reversal of phase of the excitation. In the case of a photosensitive recording, this change would consist in turning the exciting light on or off depending on its previous state. In any case we are concerned here with a digital system or a system in which one of two possible definite states exist as "on" or "off" and no meaning is attached to intermediate states as would have significance in an analog device.

One way to carry out the digital recording in a self-clocking system is to provide a transition at every cell boundary, and the information is provided by the presence or absence of a transition at substantially the center of the cell. The cell boundary transitions may be looked on as clock markers. Thus, in a sequence of recorded cells, each cell contains one clock transition and the presence or absence of an information transition. Therefore there is at least one clock transition for every information transition and the density of information which can be recorded on the medium is determined by this relationship.

It has been found according to the present invention that the effective density of recording on a medium may be increased by increasing the ratio of information transitions to clock transitions while still retaining the self-clocking characteristics. If two, three or more information transitions are provided for each clock transition, the recording density may be increased by a factor which is asymptotic to two. Practically factors of 1.5 to 1.7 may be obtained.

One way which has been found to increase the ratio of information transitions to clock transitions and hence the effective information density on the recording medium is to utilize a cell consisting in one clock transition and two or more information transitions wherein the first of said information transitions represents the first bit, and the second, the second bit of a binary coded serial character. Or, parallel bit serial characters may be recorded with the first of said information transitions representing a bit of one character, and the second representing the corresponding bit of the next character. This may be termed "double binary" recording. Similarly, "triple binary" and higher order binary systems may be constructed.

Another way to increase the ratio of information transitions to clock transitions is to use transition combinations forbidden by the above rules for preferred forms. For example, if a "single binary" information cell takes on one additional transition combination, then the cell exhibits three information states rather than two. However, in a sequence of such ternary cells, no more than two absences of a transition will occur in a row. This same condition prevails for "double binary" patterns. One such ternary scheme consists in zero represented by a clock transition and no transition at the center of the cell, one represented by a clock transition and a transition at the center of the cell and two represented by an omitted clock transition and a transition at the center of the cell. This mode of recording will still be self-clocking since the missing transition may be supplied, there being no more than two half-cell transitions missing at any time. This ternary signal may be generated by conversion from binary signals. For example, a six bit parallel binary signal may be converted to a sixty four line in -line signal in a diode matrix and this latter signal converted to a binary coded ternary signal in a second diode matrix. A double frequency clock together with suitable AND and OR gates combine signals from the second diode matrix to provide a suitable ternary recording signal. In order to recover the ternary signal from the recording medium, the clock is recovered and used to control suitable gates to reconstruct the desired output.

Accordingly, one object of the present invention is to provide methods of and means for generating, recording and reproducing ternary, quaternary and higher order signals on a recording medium in order to increase the density of recorded information which may be handled.

Another object is to increase the information density on a recording medium carried by means of transitions of state in the medium without decreasing the distance between these transitions.

Another object of the invention is to increase the density of information in a multiple transition high density recording system.

Still another object is to provide methods of and means for converting digital signals from parallel binary to parallel ternary, parallel quaternary or higher order states.

A further object is to provide clock signals from multiple transition high density recordings in which some transitions are unused.

These and other objects will be apparent from the detailed description of the invention given in connection with the various figures of the drawing.

Figures 1, 2:
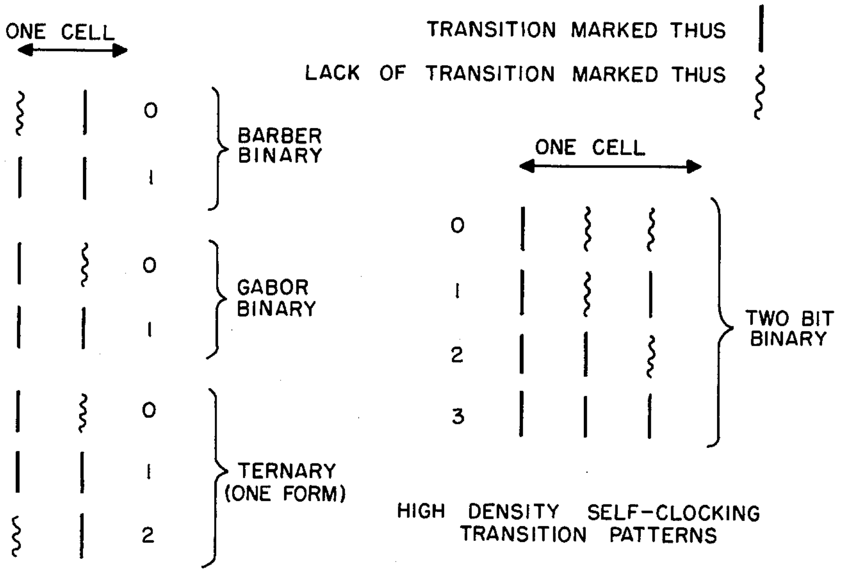
FIG. 1 is a representation of several possible high density, self clocking transition patterns.
FIG. 2 is a tabulation of bit patterns for 6 bit binary and the equivalent ternary coded and binary coded ternary signals.

FIG. 1 shows several forms of binary recording patterns, one which Barber has disclosed consisting in a transition of recording medium state at the center of the cell with a transition or absence of transition at the cell boundary, where the direction of the center transition represents 0 or 1 and another disclosed by Gabor in which a transition is always provided at the cell boundary with a transition or absence of transition at mid-cell to represent the two binary digits respectively. The full stroke represents a transition while the wavy line represents an absence of transition. This figure also shows how a ternary representation may be derived by paired combinations of transition points. It will be seen that no matter what combinations of successive digits is chosen, no more than two consecutive absences of transitions is produced. This figure shows how a third state may be provided in the same cell space hitherto occupied by two state representations. Now, if the cell is increased to three half cells or transitions, a two-bit binary representation may be provided, as shown, while maintaining a transition at every third transition point. If this representation is allowed to have three half cell transitions missing in succession, a total of six states may be recorded in the space of three transitions regardless of the sequence of digits.

FIG. 2 shows a table including four columns. The first column shows decimal numbers from 0 to 63 with a break between 8 and 60 for the purpose of condensing the table to reasonable size and the intermediate values are obvious. The second column shows the equivalent of the decimal numbers in the form of a six bit binary code. The third column shows the equivalent of the decimal numbers in the form of a four place ternary code. The fourth column shows the ternary code in binary coded form with a 1 added so that "all zeros" cannot exist. These representations are useful in explaining the operation of the present invention.

Figures 3, 4:
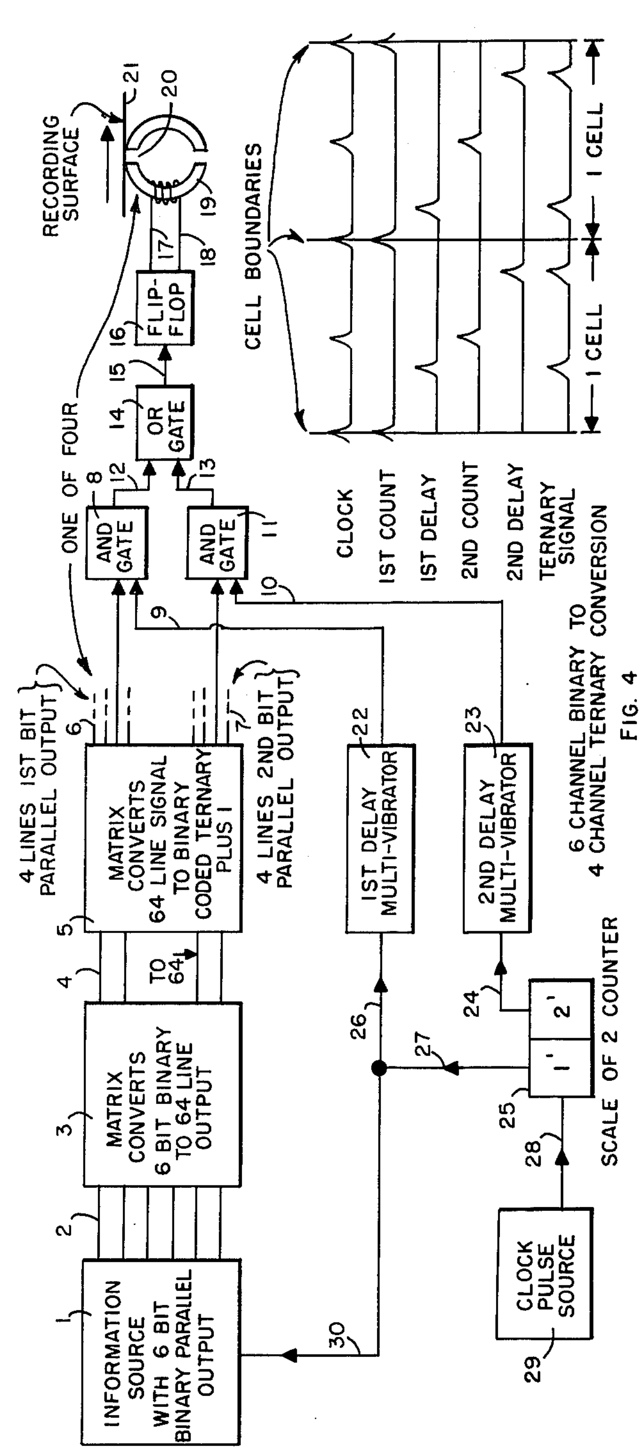
FIG. 3 is quaternary code patterns.
FIG. 4 is a system shown in block form for converting 6 bit parallel binary signals into four channel binary ternary signals and recording same on a recording medium.

FIG. 3 shows four columns of number representations which are equivalent. The first column shows decimal numbers starting at 0 and running through 63 with a break between 4 and 60 since the equivalent representation in the other columns will be apparent. The second column shows the equivalent of the decimal numbers of column 1 expressed in a quaternary code. Each of the single column numbers may have one of four values from 0 through 3 so that three such digits will represent any number from 0 through 63 (64 values). The third column shows the quaternary numbers expressed in equivalent binary code. Thus it may be seen that decimal numbers covering 64 different values require a 6 bit binary code for expression but may be represented by 4 ternary digits in a ternary code and by 3 quaternary digits in a quaternary code. The fourth column of FIG. 3 shows the quaternary numbers in a binary coded plus 1 representation. It will be seen that by adding 1 to these binary coded ternary and quaternary representations that self-clocking high density methods and techniques may be used in the recording since a succession of zeros is avoided.

FIG. 4 is a block diagram of one way in which ternary recording may be practiced. This mode of recording is applied to a 6 bit binary parallel signal. The information source provides this 6 bit binary parallel output signal from source 1 and feeds the six lines 2 connected to matrix 3 which converts the parallel 6 bit binary signals to 64 independent output lines 4 (see FIG. 5). These 64 outputs are applied to matrix 5 which converts the signals to the two sets of 4 lines 6 and 7 carrying binary coded ternary signals (see FIG. 6). Matrix 3 is shown in detail in FIG. 5 while matrix 5 is shown in detail in FIG. 6. The circuit of FIG. 6 includes AND and OR gates which are shown as 8, 11 and 14 in FIG. 3 (for one channel). The gating of the pulses in proper sequence is controlled by clock 29 operating at twice the cell frequency. A scale of 2 counter 25 receiving the clock output over line 28 provides one pulse over line 27 for every two clock pulses and a second pulse over line 24 for every two clock pulses. The first pulse over line 27 is applied over line 30 to control the release of data from source 1 and over line 26 actuates multivibrator 22 the output of which is applied over line 9 to actuate AND gate 8. This first pulse therefore times the release of data from the information source and gates the binary coded ternary transitions at the cell boundaries. The delay is necessary to allow time for the signals to tranverse the matrix converters 3 and 5. The second pulse from counter 25 is applied over line 24 to a second delay multivibrator 23 the output of which is applied over line 10 to AND gate 11 in order to gate the mid-cell transitions comprising the ternary signal. The pulse diagram forming a part of FIG. 3 shows the pulse timing resulting from this operation. The first line shows the clock pulses consisting of a pulse at each cell boundary and a mid-cell pulse. The second line shows the output of the first section of the scale of 2 counter consisting in cell boundary pulses since these pulses time the data release from the information source. The third line shows these first count pulses as delayed. This third line will also serve to represent transition pulses released from AND gate 8. The fourth line represents the output of the second stage of the scale of 2 counter, consisting in mid-cell pulses. The fifth line represents these second stage pulses delayed as applied to the second AND gate 11. This line may also be taken to represent the mid-cell transition pulses leaving this AND gate if present. Thus the sixth line shows the result of combining the third and fifth lines i.e. the boundary of mid-cell ternary signal transitions and forming the signal leaving OR gate 14 over line 15. These ternary signals on line 15 are applied to means for driving a suitable recording means such as magnetic head 19 having recording gap 20 for recording on a magnetic tape 21 and excited by flip-flop 16 driving the head coil over lines 17 and 18.

Figure 5:
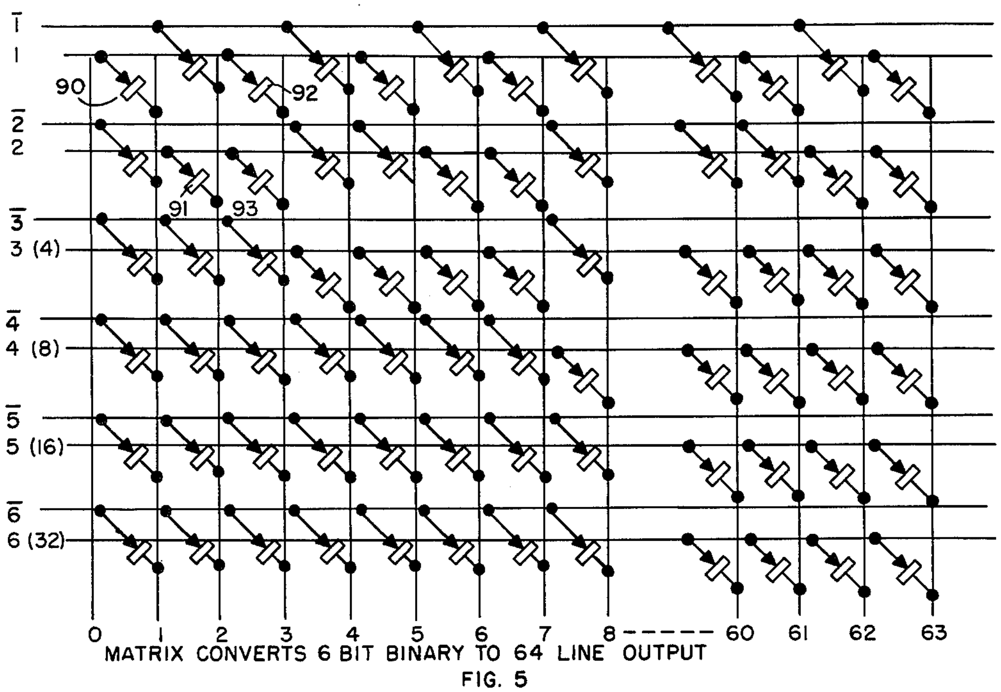
FIG. 5 is a schematic of a matrix suitable for converting 6 bit binary to 64 line signals.

FIG. 5 shows one way in which six bit parallel (simultaneous) information may be converted to 64 line output as a step in converting to binary coded ternary plus 1 information. This circuit is shown only from 0 through 8 and 60 through 63 since the intermediate circuit connections will be obvious. The lines from the left are designated 1 through 6 representing the 6 bit parallel lines, together with inverted, on "NOT 1," "NOT 2," etc. lines. The numeral values of the bits on these lines are shown in parentheses where different from the line numbers. The output lines are numbered 0 through 63. Thus, when a numerical 1 appears in the information source, diode 90 directs the informational pulse to output line 1. When 2 appears, it is directed from its input line 2 to output line 2 through diode 91. When 3 appears, since it consists in the sum of 1 plus 2, lines 1 and 2 are coupled to output line 3 by diodes 92 and 93. Diodes connecting the "Not *n*" input lines to the output lines are utilized to prevent false excitation of the output lines which would otherwise occur from the plurality of parallel inputs. In this way all input numbers are directed to the proper output lines up through output 63 representing the sum 1 plus 2 plus 4 plus 8 plus 16 plus 32. The 0 or absence of output pulses represents the 64th output number.

Figure 6:
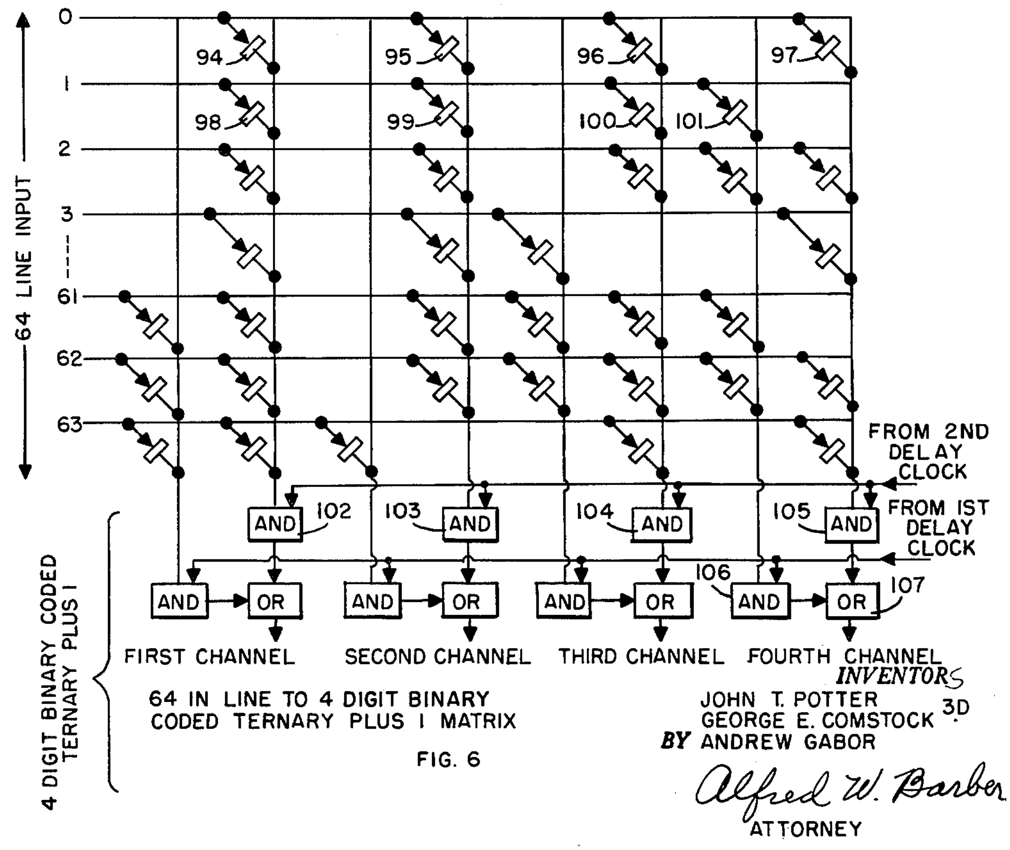
FIG. 6 is a schematic of a matrix suitable for converting 64 in line signals to two phase binary coded ternary signals.

FIG. 6 shows one way in which a matrix may be used to convert the 64 line signals to binary coded ternary plus 1 signals. The 1 is added so that no more than two contiguous absences of signal bits may exist in the output (see FIG. 2). The 64 input lines are represented at the left of the figures, with a gap between 3 and 61 since intermediate connections will be obvious. The operation of this matrix will be clear when its diode couplings are scanned while referring to the table in FIG. 2 labeled "4 Digit binary coded ternary plus 1." The first digit in each column may be taken as the one to be released by the 1st delay clock and the second digit by the 2nd delay clock. Thus, 0 is repreesnted by pulses in each column in the 2nd delay position and provided by diodes 94, 95, 96 and 97 to AND gates 102, 103, 104 and 105 respectively. One of these gates may be taken to represent gate 11 of FIG. 4. The decimal 1 is represented by pulses in the second positions of the first three columns as supplied by diodes 98, 99, and 100 and by a first position pulse in the fourth column supplied by diode 101 to 1st delay clock connected and gate 106 which may be taken as gate 8 of FIG. 4. If OR gate 107 is taken as equivalent to OR gate 14 of FIG. 4 it may be taken that the recording head 19 of FIG. 4 is recording fourth column representations of FIG. 2. Three more recording heads, one for each of the remaining columns of FIG. 2 will complete the system. FIG. 6 shows the four output channels through the OR gates. Thus it has been shown how a six bit binary parallel signal requiring six recording channels may be converted to a four channel ternary signal with a resulting higher density of recorded information on the recording medium. In addition to reducing the required number of channels from 6 to 4, with a corresponding increase in tape utilization the ternary system makes available 81 distinct states in 4 information cells as opposed to only 64 states in 6 information cells of the binary system. While magnetic recording has been mentioned, the advantages of the binary coded ternary recording may be realized equally in utilizing other recording media.

Figure 7:
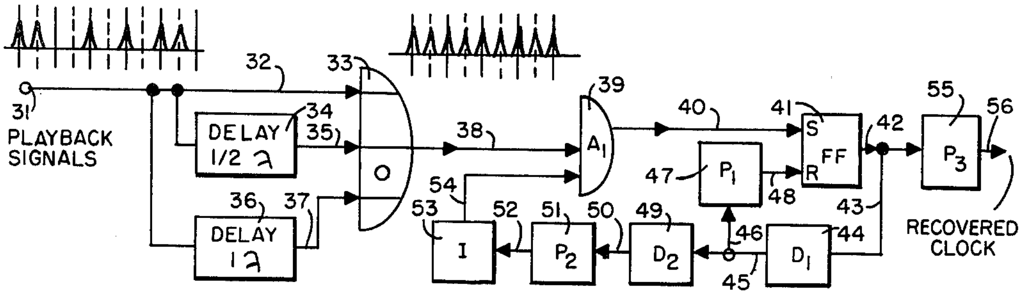
FIG. 7 is a system shown in block form for recovering ternary signals from a recording medium.
Figure 8:
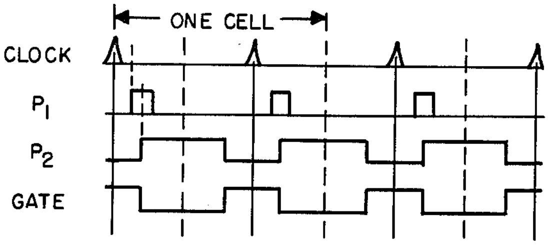
FIGURE 8 is a graphic representation of the operation of FIG. 7.

FIGS. 7, 8, and 9 and 10 show one way in which binary coded ternary plus 1 information may be recovered from the recording medium. FIG. 7 shows in block diagram form, one way in which clock signals may be derived from the binary coded ternary plus 1 recordings. This recovery of clock signals may be practiced for each channel so that the binary coded ternary plus 1 recording may be termed "self-clocking" which is of considerable advantage in high density recordings. The playback signals are applied at terminal 31 and have the form shown graphically just above where solid vertical lines represent cell boundaries and vertical dotted lines represent mid-cell positions. If these signals are fed over line 32 to OR gate 33 together with these same signals delayed by a time equal to ½ cell time in delay network 34 over line 35 and delayed by a time equal to 1 cell time in delay network 36 over line 37, the output on line 38 will contain a pulse for every boundary and mid-cell point as shown graphically just above. These pulses are applied to AND gate 39. The output of AND gate 39 over line 40 serves to set flip-flop 41. The output of flip-flop 41 is applied over line 43 to delay network 44 which actuates pulse generator 47 over lines 45 and 46 which in turn resets flip-flop 41 over line 48. FIG. 8 shows in line 2 the timing of the resetting pulses $P_1$ delayed slightly from the cell boundaries. Pulses from delay network 44 are applied to an additional delay network 49 over line 45 and these further delayed pulses are applied to pulse generator 51 over lines 50. The pulses generated by generator 51 are applied over lines 52 to inverter 53 the output of which is applied over lines 54 to AND gate 39 where the desired clock signals are gated. This sequence of events is illustrated in FIG. 8 where the third line shows the pulses generated in generator 51 delayed slightly from the pulses generated in generator 47 and the fourth line shows these pulses inverted to form AND gate signals to gate only the clock signals shown in the first line into the output of AND gate 39. Thus clock signals are provided which actuate pulse generator 55 over line 42 and provide a recovered clock signal at output line 56. This recovered clock signal circuit of FIG. 7 is represented by block 57 of FIG. 9 and forms a part of this circuit which completes the recovery of the binary coded ternary signals.

Figure 9:
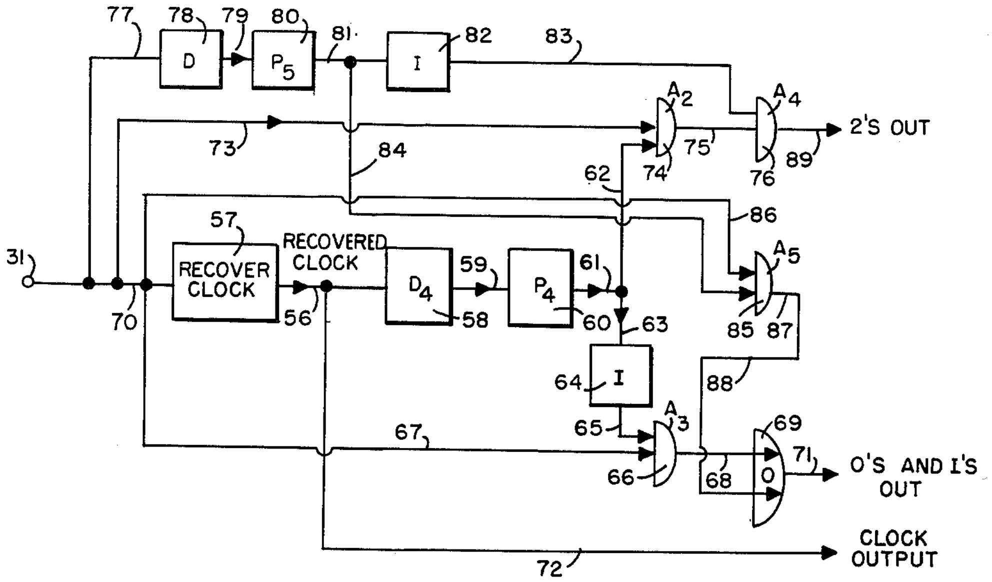
FIGURE 9 is a system shown in block form for recovering binary coded ternary signals from a recording medium.
Figure 10:
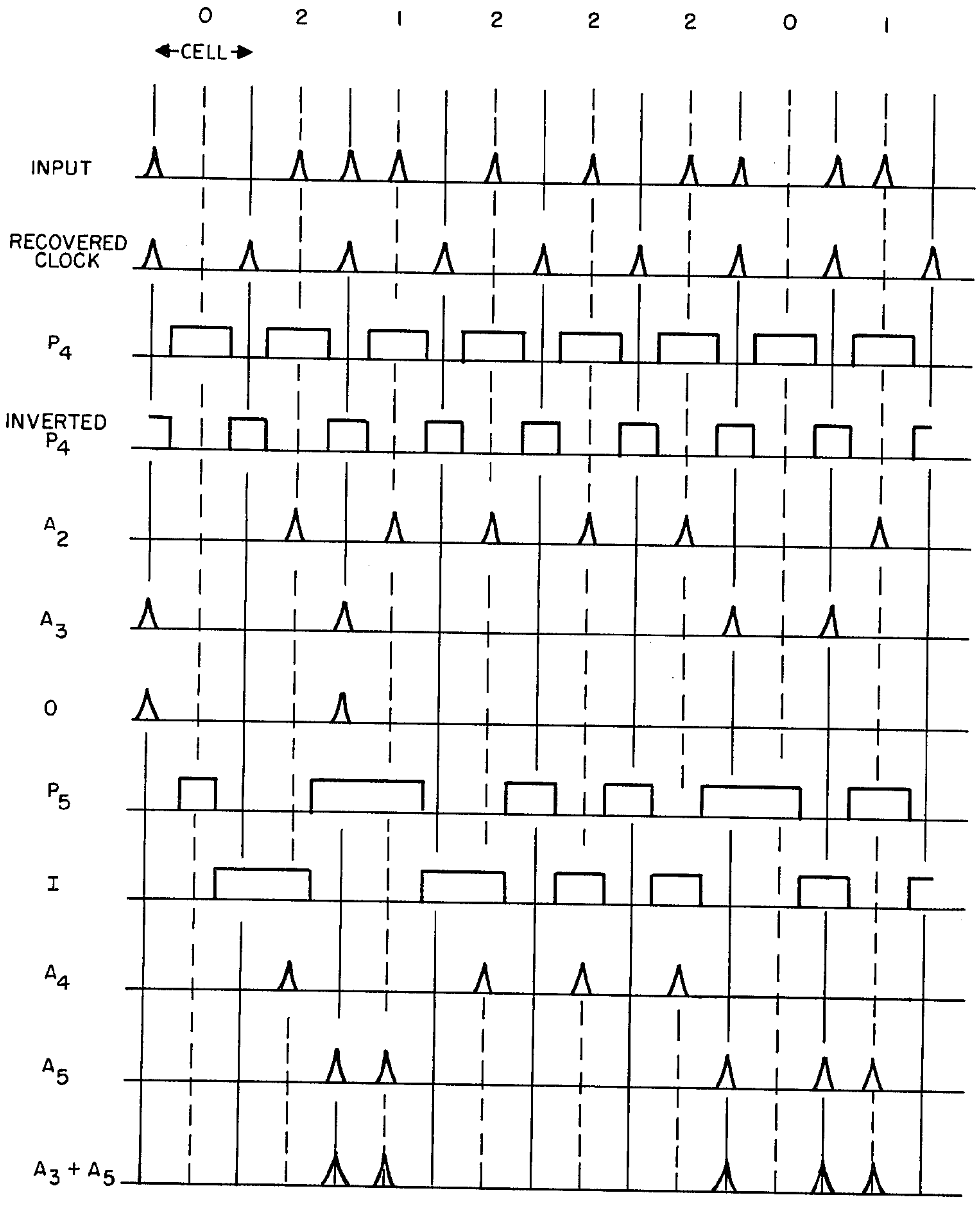
FIGURE 10 is a graphic representation of the operation of FIG. 9.

FIG. 9 taken in conjunction with the pulse representations of FIG. 10 illustrate one way in which the binary coded ternary plus 1 self-clocking signals may be completely recovered. At the top of FIG. 10 is shown a series of numbers to be recovered and which are assumed to have been recorded in the cells as shown on the line marked INPUT. This input signal is applied to terminal 31 of FIG. 9 and over lines 70 to the clock recovery unit 57 as shown in FIG. 7 and described above. The recovered clock is shown on the second line of FIG. 10 and is applied over line 72 to an output means in FIG. 9. The clock over line 56 is delayed in delay unit 58 and its output over line 59 is applied to pulse generator 60. The output of generator 60 at line 61 is represented on line three of FIG. 10. This pulse output will be seen to have the polarity and timing required to gate all mid-cell signal pulses so that when it is applied over lines 61 and 62 together with signal pulses over line 73 to AND gate 74 an output on line 75 is provided which consists in all mid-cell signals as shown on the fifth line of FIG. 10 marked *Az*. This is the first step in recovering signals representing 2 or the third state of the ternary signals. The second step utilizes the signals over line 77 where they are delayed in delay unit 78 the output of which is applied to pulse generator 80 over line 79 to generate pulses on line 81 as shown in the eighth line of FIG. 10. These pulses inverted in inverter 82 the output of which is applied to AND gate 76 over line 83. This inverted pulse chain is shown in the ninth line of FIG. 10 will gate mid-cell signals only if proceeded by a pulse and hence will gate only mid-cell pulses on line 75 which represent 2*s* and reproduce them on output line 89.

The second signal recovery is to recover all 0's and 1's on one line i.e. all of the first and second states of the ternary signal. In FIG. 9 the output of pulse generator 60 is applied over lines 61 and 63 to inverter 64 to generate a signal as shown in the fourth line of FIG. 10 which when applied AND gate 66 over line 65 gates all boundary pulses from the input applied over line 67 and providing an output on line 68 representing all boundaries as shown on the sixth line of FIG. 10. Pulses from generator 80 over line 84 applied to AND gate 85 will gate all mid-cell signals preceded by a signal ½ cell away (characteristic of 1's but not 2's) applied over line 86 to produce signals as shown in the eleventh line of FIG. 10. These signals over lines 87 and 88 when added to signals over line 68 in OR gate 69 will provide signals representing 0's and 1's on line 71 as shown in the twelfth line of FIG. 10. Thus has been shown the complete recovery with clock of the ternary signals with the first and second states represented in binary fashion on one output line and the third state signals on a second output line.

Figure 11:
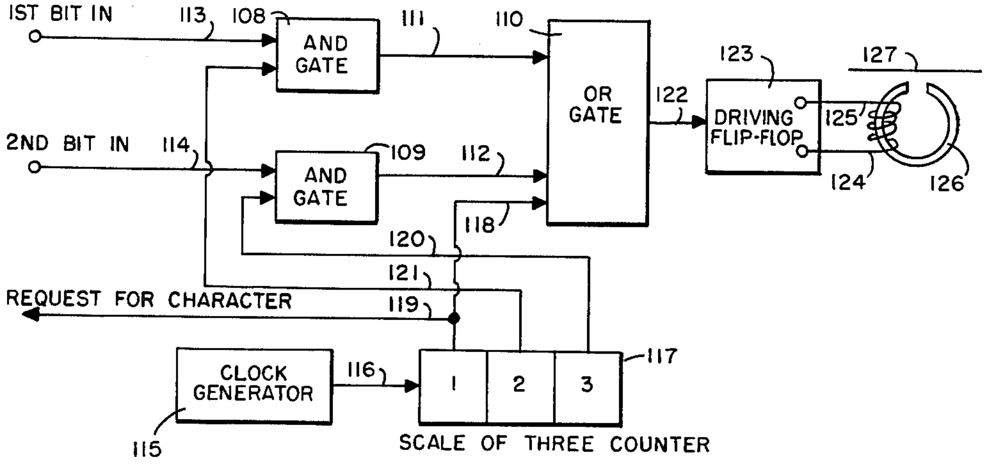
FIGURE 11 is a system shown in block form for recording two bit binary forms.

Two bit binary recording is similar to the binary coded ternary method described above in that at most only two absences of a transition may occur in sequence. However, as shown in figure 1 a transition is always present at some convenient point in the information cell, such as at the leading edge. The advantage of this method is a simplification in the recording and playback logic while providing 33% more information bits per unit area of the recording medium. In FIG. 11 is shown in block diagram form one circuit whereby two-bit binary recording may be practiced. Only the unique portions of the complete system are shown since the remaining components required to carry out the recording may be conventional and well-known in the art. It will be assumed that the two bits to be recorded are made available on input lines 113 and 114 connected to AND gates 108 and 109 respectively. A clock generator 115 is utilized having an output pulse repetition rate of three times the information cell formation rate. The clock generator 115 feeds a scale of three counter 117 over line 116 so that three spaced pulses are made available per information cell. The first pulse per cell may be utilized over line 119 to provide a request for character pulse, the second over line 121 is applied to AND gate 108 to release the first bit per cell, if present, and the third pulse over line 120 is applied to AND gate 109 to release the second bit per cell if present. FIG. 1 shows the transition patterns utilized in the two bit binary recording. The complete signal assembled in OR gate 110 where the first or boundary pulse or transition is applied over lead 118 from the first stage of counter 117, the first bit pulse or transition is applied over line 111 from AND gate 108 and the second pulse or transition per cell is applied over line 112 from AND gate 109. The complete two bit binary signal is applied to the recording head driving flip-flop 123 from OR gate 110 over line 122. Driving flip-flop 123 provides recording current to recording head 126 for impressing recording medium 127 over lines 124 and 125.

Figure 12:
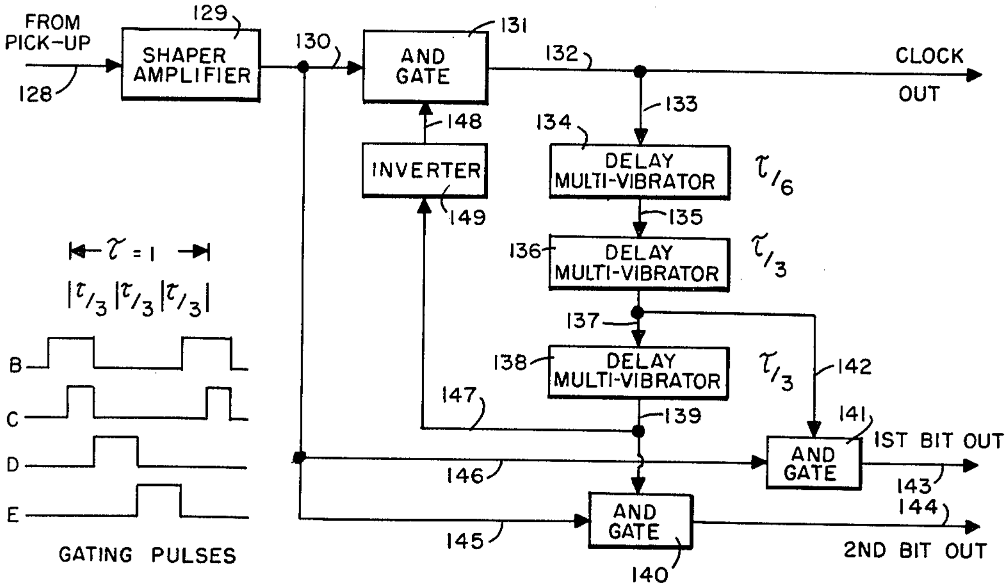
FIGURE 12 is a recovery system for the recording of FIG. 11.

The recovery of information recorder on a recording medium in the two bit binary form may be carried out by circuits the unique portions of which are shown in FIG. 12. Signals from a suitable pick-up are applied over line 128 to a suitable shaper amplifier 129 from which they are applied to AND gate 131. Gating signals are applied from inverter 149 over lead 148 which have the form shown on line B of the gating pulse diagram. The on periods of these pulses covering the boundary intervals of the informaiton cell permit cell boundary pulses to pass which may be considered to be clock signals passed out over line 132. These clock pulses applied to delay multi-vibrator 134 over line 133 turn on this multi-vibrator for a time equal to one-sixth cell period as shown on line C of the pulse diagram. The signals from multi-vibrator 134 are applied to delay multi-vibrator 136 over line 135 so that the trailing edge of the C line pulses turn it on for one third of a cell period to generate the signal shown on line D. This pulse over line 142 is applied to AND gate 141 to gate the first bit signals from line 146 to the first bit output line 143. This pulse is also applied over line 137 to delay multi-vibrator 138 where its trailing edge turns on multi-vibrator 138 for one-third period as shown on line E. This pulse over line 139 turns on AND gate 140 to gate the second bit of the information signal supplied over line 145 and provides the second bit output to line 144. The output of multi-vibrator 138 is also applied to inverter 149 for one-third cell time period over line 147 to generate the clock gating as shown on line B.

Figure 13:
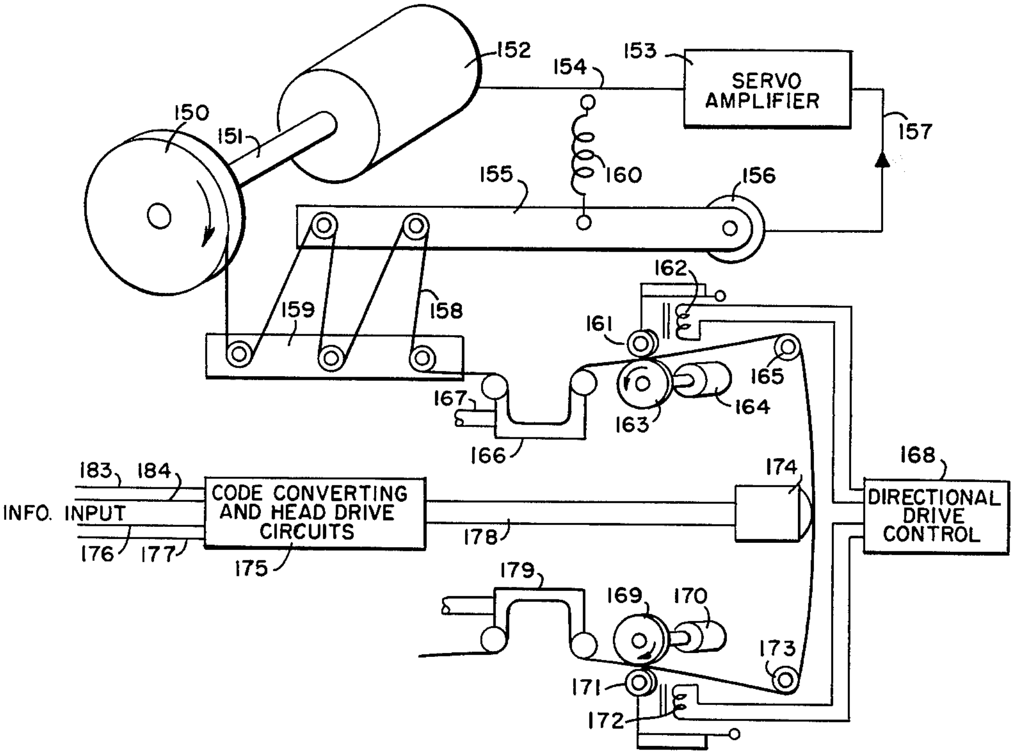

FIG. 13 is a diagrammatic representation of a digital recording system utilizing the coded high density recording techniques set forth above. While these recording techniques may be used in recorders utilizing recording surfaces carried by drums or flat plate-like surfaces, the system is shown utilizing a recording type since this is at the present time the most widely used medium. The recording tape 158 passes from a first storage reel 150 to a second storage reel 180 over a path which includes; rollers carried by a movable tension arm 155, rollers carried by a stationary arm 159, a vacuum chamber 166, a drive capstan 163, guide roller 165, recording head 174, guide roller 173, drive capstan 169, vacuum chamber 179, rollers carried by movable tension arm 181, and fixed tension arm 182. Storage reel 150 is driven by suitable means such as servo motor 152, coupled over shaft 151 and energized in accordance with the position of tension arm 155 as monitored by transducer 156 connected to servo amplifier 153 over circuit 157 and connected to amplifier 153 by circuit 154. Arm 155 is tensioned by suitable means such as spring 160. Vacuum chamber 166 is coupled to a suitable source of vacuum not shown, over duct 167. Capstan 163 is driven at a suitable speed by motor 164 and when it is desired to pull the tape in direction provided by this captsan, pinch roller 161 is pulled down by magnet 162 energized from a command source 168. The tape receives its digital signal impressions through the action of record/play-back head 174 coupled to a code converting and head drive device 175 connected by circuits 178. This code converting and head drive device 175 receives digital input over leads 176–177 and on play-back provides output signals over leads 183–184. There input and output leads may be any number of leads and circuits in accordance with whether the input is serial or parallel and may depend on the number of digits in the code being used. The code converting device 175 may be taken to include the encoding, decoding and other circuits set forth above in conjunction with or as a part of the present invention whether circuits used in the recording phase of operation or in the signal recovery phase of operation.

While only a few embodiments of the present invention have been shown and described, many modifications will be apparent to those skilled in the art and within the spirit and scope of the invention as set forth in particular in the appended claims.

What is claimed is:

1. A high density information processing system comprising an information storage medium capable of maintaining two distinct states, transducer means for recording on said medium by changing the state of said medium from one of said states to the other within a localized region, means to provide relative movement between said storage medium and said transducer means so that said transducer means is operable to record transitions between said states along a track on said medium, a source of information, encoding means responsive to information from said source to cause said transducer means to record a pattern of said transitions along said track to represent said information in accordance with a code including (1) means to space transition positions containing a transition or the absence of a transition at regularly occurring intervals along said track, (2) means to divide said transition positions into cells of a predetermined number of transition positions greater than one and, (3) means responsive to said information from said source to provide at least one transition in each cell in a pattern in which the maximum number of transition positions in a row which do not contain a transition is a small predetermined number greater than one, said transducer means including read-out means for producing pulses in response to said transitions as said track is moved relative to said transducer means, and means responsive to the pulses produced by said read-out means to produce clock pulses occurring at regular intervals and to produce information pulses representing the information recorded in said track in accordance with said code.

2. A high density information processing system comprising an information storage medium capable of maintaining two distinct states, transducer means for recording on said medium by changing the state of said medium from one of said states to the other within a localized region, means to provide relative movement between said storage medium and said transducer means so that said transducer means is operable to record transitions between said states along a track on said medium, a source of information, encoding means responsive to information from said source to cause said transducer means to record a pattern of said transitions along said track to represent said information in accordance with a code including (1) means to space transition positions containing a transition or the absence of a transition at regularly occurring intervals along said track, (2) means to divide said transition positions into cells of N transition positions, N being an integer greater than one, and (3) means responsive to information from said source to provide at least one transition in each cell in a pattern in which the maximum number of transitions in a row which do not contain a transition is $2N-2$, said transducer means including read-out means for producing pulses in response to said transitions as said track is moved relative to said transducer means, and means responsive to the pulses produced by said read-out means to produce clock pulses occurring at regular intervals and to produce information pulses representing the information recorded in said track in accordance with said code.

3. A high density information processing system comprising an information storage medium capable of maintaining two distinct states, transducer means for recording on said medium by changing the state of said medium from one of said states to the other of said states within a localized region, means to provide relative movement between said storage medium and said transducer means so that said transducer means is operable to record transitions between said states along a track on said medium, a source of information, and encoding means responsive to information from said source to cause said transducer means to record a pattern of said transitions along said track to represent said information in accordance with a code including (1) means to space transition positions containing a transition or the absence of a transition at regularly occurring intervals along said track, (2) means to divide said transition positions into cells of two transition positions, and (3) means responsive to the information from said source to provide at least one transition in each cell in a pattern in which the maximum number of transition positions in a row which do not contain a transition is two, said transducer means including read-out means for producing pulses in response to said transitions as said track is moved relative to said transducer means, and means responsive to the pulses produced by said read-out means to produce clock pulses occurring at regular intervals and to produce information pulses representing the information recorded in said track in accordance with said code.

4. A high density information processing system comprising an information storage medium capable of maintaining two distinct states, transducer means for recording on said medium by changing the state of said medium from one of said states to the other within a localized region, means to provide relative movement between said storage medium and said transducer means so that said transducer means is operable to record transitions between said states along a track on said medium, a source of information, and encoding means responsive to information from said source to cause said transducer means to record a pattern of said transitions along said track to represent said information in accordance with a code including (1) means to space transition positions containing a transition or the absence of a transition at regularly occurring intervals along said track, (2) means to divide said transition positions into cells of two transition positions, and (3) means to provide at least one transition in each cell and selectively operable in response to said information from said source to provide in each cell a transition only at a first one of the positions of such cell, a transition only at the other one of the positions of such cell, or at both positions of such cell to represent said information.

5. A high density information processing system comprising an information storage medium capable of maintaining two distinct states, transducer means for recording on said medium by changing the state of said medium from one of said states to the other within a localized region, means to provide relative movement between said storage medium and said transducer means so that said transducer means is operable to record transitions between said states along a track on said medium, a source of information, and encoding means responsive to information from said source to cause said transducer means to record a pattern of said transitions along said track to represent said information in accordance with a code including (1) means to space transition positions containing a transition or the absence of a transition at regularly occurring intervals along said track, (2) means to divide said transition positions into cells of two transition positions, and (3) means to provide at least one transition in each cell and selectively operable in response to said information from said source to provide in each cell a transition only at a first one of the two transition positions in such cell, a transition only at the other one of the two transition positions of such cell, or transitions at both of the two transition positions of such cell to represent said information, said transducer means including read-out means for producing pulses in response to said transitions as said track is moved relative to said transducer means, and means responsive to the pulses produced by said read-out means to produce clock pulses occurring at regular intervals and to produce information pulses representing the infromation recorded in said track in accordance with said code.

6. A high density information storage system comprising a magnetic recording medium, transducer means for magnetically recording on said medium, means to provide relative movement between said transducer means and said medium so that said transducer means is operable to record along a track on said medium, a source of information, encoding means responsive to information from said source to cause said transducer means to record a pattern of flux transitions between two distinct states of magnetization along said track to represent said information in accordance with a code including (1) means to space flux transition positions containing a flux transition or the absence of a flux transition at regularly occurring intervals along said track, (2) means to divide said flux transition positions into cells of a predetermined number of flux transition positions greater than one, and (3) means responsive to the information from said source to provide at least one flux transition in each cell in a pattern in which the maximum number of flux transition positions in a row which do not contain a flux transition is a small predetermined number greater than one, said transducer means including read-out means for producing pulses in response to said transitions as said track is moved relative to said transducer means, and means responsive to the pulses produced by said read-out means to produce clock pulses occurring at regular intervals and to produce information pulses representing the information recorded in said track in accordance with said code.

References Cited by the Examiner

UNITED STATES PATENTS

| | | | |
|---|---|---|---|
| 2,832,063 | 4/1958 | McMillan et al. | 340—174 |
| 2,972,735 | 2/1961 | Fuller et al. | 340—174.1 |
| 3,001,140 | 9/1961 | Beck | 340—174.1 X |
| 3,072,893 | 1/1963 | Fuller | 340—174.1 |
| 3,151,404 | 10/1964 | Schott | 34—33 |

OTHER REFERENCES

Pages 12–18, to 12–20, 19–10 to 19–20, Oct. 12, 1959, Handbook of Automation, Computation and Control, vol. 2, by Grabbe, Ramo & Woolridge.

Pages 64 to 65, December 1959, Morphet, Self-Syncing Clock for Binary Data, IBM Technical Disclosure Bulletin, vol. 2, No. 4.

Pages 270–272, June 1955, Klein, A Simplified Method for the Design of Logical Conversion Matrices, in Electronic Engineering.

ROBERT C. BAILEY, *Primary Examiner.*

IRVING L. SRAGOW, MALCOLM A. MORRISON, R. M. RICKERT, *Assistant Examiners.*